(12) United States Patent
Smith

(10) Patent No.: US 8,186,310 B1
(45) Date of Patent: May 29, 2012

(54) COLLAR SYSTEM FOR PROTECTION OF CATS FROM DOGS

(76) Inventor: Theodore L. Smith, Battle Creek, MI (US)

(*) Notice: Subject to any disclaimer, the term of this patent is extended or adjusted under 35 U.S.C. 154(b) by 20 days.

(21) Appl. No.: 12/841,948

(22) Filed: Jul. 22, 2010

(51) Int. Cl.
*A01K 15/02* (2006.01)
*A01K 29/00* (2006.01)

(52) U.S. Cl. .......................... 119/719; 119/721
(58) Field of Classification Search .............. 119/719, 119/721, 720, 856, 859
See application file for complete search history.

(56) References Cited

U.S. PATENT DOCUMENTS

| | | | |
|---|---|---|---|
| D306,504 S | | 3/1990 | Young |
| 5,575,242 A | * | 11/1996 | Davis et al. .................. 119/721 |
| 5,632,232 A | | 5/1997 | Waters |
| 5,636,597 A | * | 6/1997 | Van Curen et al. ........... 119/720 |
| 5,952,925 A | * | 9/1999 | Secker ...................... 340/573.2 |
| 6,064,308 A | * | 5/2000 | Janning et al. .............. 340/573.3 |
| 6,158,392 A | * | 12/2000 | Andre et al. .................. 119/721 |
| 6,561,137 B2 | * | 5/2003 | Oakman ........................ 119/721 |
| 6,581,546 B1 | | 6/2003 | Dalland et al. |
| 7,021,244 B2 | * | 4/2006 | Boyd ............................ 119/721 |
| 7,046,152 B1 | | 5/2006 | Peinetti et al. |
| 7,278,376 B1 | * | 10/2007 | Peinetti et al. .............. 119/721 |
| 7,385,513 B2 | * | 6/2008 | Everest et al. ............ 340/573.1 |
| 2008/0223308 A1 | * | 9/2008 | Stern ............................ 119/720 |
| 2009/0002188 A1 | | 1/2009 | Greenberg |

* cited by examiner

*Primary Examiner* — Yvonne Abbott

(57) ABSTRACT

A collar system featuring a dog collar with a first housing, wherein a shocking component is disposed on the first housing and a sound component and a receiver component are each disposed in the first housing, the sound component is adapted to emit a tone when activated and the shocking component is adapted to emit a shock when activated; and a cat collar with a second housing, wherein a transmitter component is disposed in the second housing, the transmitter component is adapted to send a transmitter signal to the receiver component in the first housing within a range; wherein when the dog with the dog collar is within the range of the cat, the receiver component receives the transmitter signal effectively activating either the shocking component, the sound component, or both the shocking component and sound component.

9 Claims, 3 Drawing Sheets

COLLAR SYSTEM FOR PROTECTION OF CATS FROM DOGS

FIELD OF THE INVENTION

The present invention is directed to pet collars with transmitters and receivers, more particularly to a collar system including a cat collar and a dog collar in communication with each other such that when the dog collar is in close proximity to the cat collar the dog collar emits a shock or a tone.

BACKGROUND OF THE INVENTION

In some situations, a cat owner may adopt a dog, but the dog does not adapt well to the presence of the cat in the home. The dog may harass the cat, causing the dog to be perceived as aggressive. The present invention features a collar system including a cat collar for a cat and a dog collar for a dog. The collars are in communication with each other, e.g., via transmitter-receiver signals, such that when the dog collar is in close proximity to the cat collar the dog collar emits a shock or a tone (or other type of alert). This helps the dog remain a certain distance from the cat, teaching the dog appropriate behavior around the cat. And, the system helps provide a safety zone for the cat. The system is adjustable until dog learns to behave around the cat, for example the range of the transmitter-receiver signals may be adjustable.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a collar system for helping to train a dog to remain a certain distance from cats (e.g., teaching the dog appropriate behavior around cats). In some embodiments, the collar system comprises a dog collar comprising a first collar band for securing around a neck of a dog via a first attachment means, wherein a first housing is disposed on the first collar band, the first housing having an outer surface, an inner surface, and an inner cavity, wherein a shocking component is disposed on the inner surface of the first housing and a first microprocessor, a sound component, and a receiver component are each disposed in the first housing, the first microprocessor is operatively connected to each the shocking component, the sound component, and the receiver component, the sound component is adapted to emit a tone when activated and the shocking component is adapted to emit a shock when activated; and a cat collar comprising a second collar band for securing around a neck of a cat via a second attachment means, wherein a second housing is disposed on the second collar band, the second housing having an outer surface, an inner surface, and an inner cavity, wherein a second microprocessor and a transmitter component are each disposed in the second housing, the transmitter component is adapted to send a transmitter signal to the receiver component in the first housing within a range, the second microprocessor is operatively connected to the transmitter component. The first microprocessor is adapted to receive a first receiver signal from the receiver component when the receiver component receives the transmitter signal from the transmitter component, wherein upon receipt of the first receiver signal the first microprocessor is configured to either (i) send a first alert output command to the shocking component to activate the shocking component at a particular level for a first length of time, (ii) send a second alert output command to the sound component to activate the sound component; or (iii) send both a first alert output command to the shocking component to activate the shocking component at a particular level for a first length of time and a second alert output command to the sound component to activate the sound component.

In some embodiments, the first attachment means is a buckle, a clasp, a snap, or a button. In some embodiments, a power source is disposed in the first housing, the power source being operatively connected to the shocking component and the first microprocessor. In some embodiments, the system further comprises a first indicator light disposed on the first housing for indicating status of a power source. In some embodiments, the second attachment means is a buckle, a clasp, a snap, or a button. In some embodiments, a power source is disposed in the second housing, the power source being operatively connected to the second microprocessor. In some embodiments, the system further comprises a second indicator light disposed on the second housing for indicating status of a power source. In some embodiments, the range is between about 0 and 4 feet. In some embodiments, the range is between about 0 and 8 feet. In some embodiments, the range is between about 0 and 10 feet. In some embodiments, the range is between about 0 and 15 feet. In some embodiments, the range is more than about 15 feet. In some embodiments, the system further comprises an on/off switch disposed on each the cat collar and the dog collar for turning the transmitter and receiver component, respectively, on or off.

DESCRIPTION OF PREFERRED EMBODIMENTS

Referring now to FIG. 1-5, the present invention features a collar system 100 for helping teach a dog to remain a certain distance from a cat, and providing a safety zone for the cat. The system 100 of the present invention comprises a cat collar 110 for a cat and a dog collar 210 for a dog. The collars 110, 210 are in communication with each other, e.g., via transmitter-receiver signals, such that when the dog collar 210 is in close proximity to the cat collar 110 the dog collar 210 emits a shock or a tone. The system is similar to dog collars used with electric fences, which are well known to one of ordinary skill in the art. However, the transmitting components are included in the cat collar 110. The system 100 of the present invention may include multiple cat collars or dog collars for multiple dogs or cats at the home.

Figure 1:
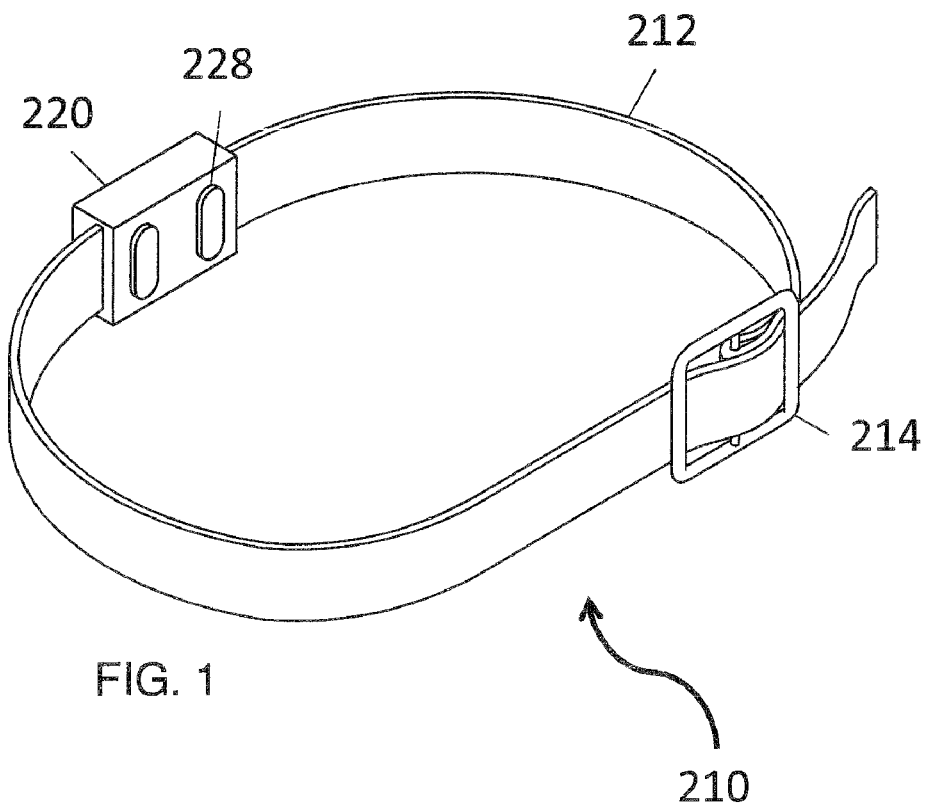
FIG. 1 is a perspective view of the dog collar of the system of the present invention.
Figure 2:
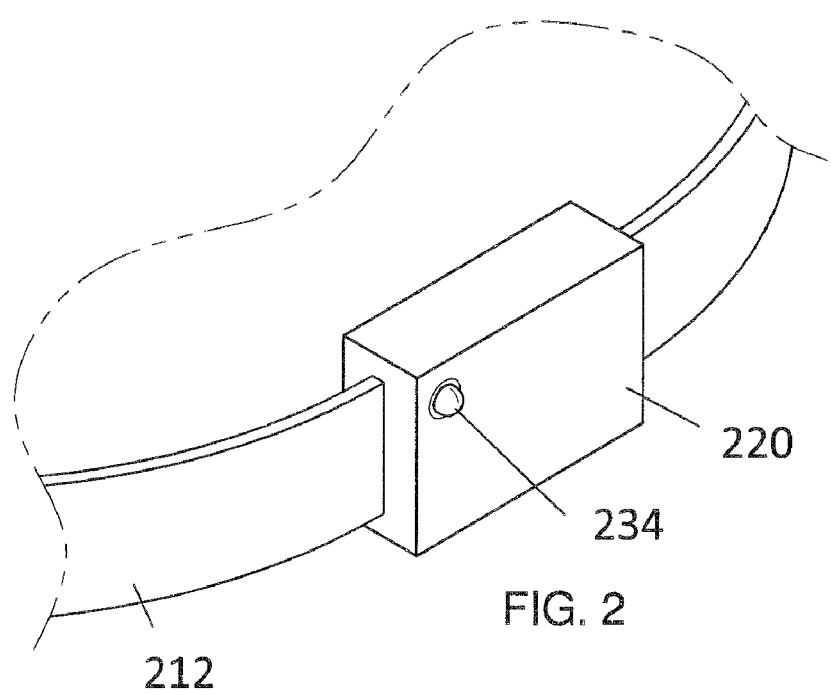
FIG. 2 is an exploded view of the dog collar of FIG. 1.
Figure 3:
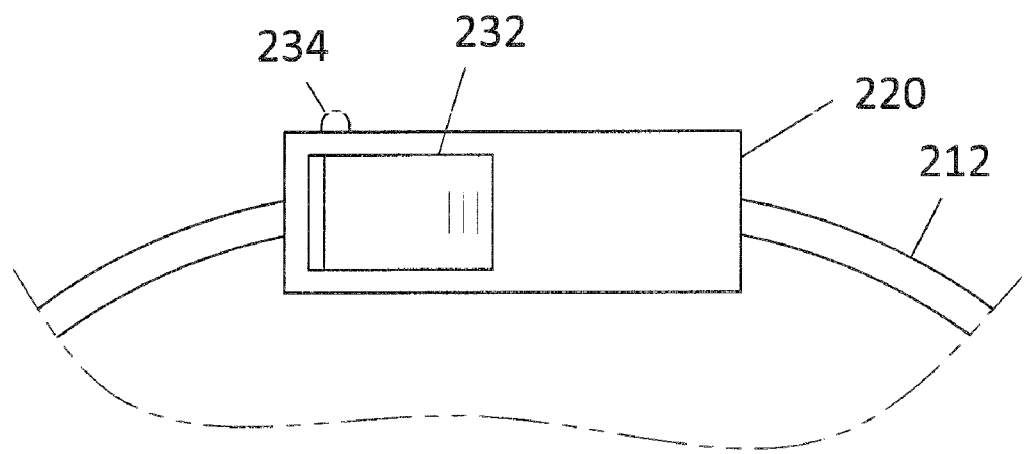
FIG. 3 is a bottom view of the dog collar of FIG. 2.

As shown in FIGS. 1-3, the dog collar 210 comprises a first collar band 212 for securing around the neck of the dog via a first attachment means 214 (e.g., a buckle, a clasp, a snap, a button, etc.). Disposed on the first collar band 212 is a first housing 220 for housing various electrical components. The first housing 220 has an outer surface, an inner surface, and an inner cavity. A shocking component 228 is disposed on the inner surface of the first housing 220. Shocking components are well known to one of ordinary skill in the art and are commonly found on dog collars used with electric fences.

Disposed in the first housing 220 is a first microprocessor operatively connected to the shocking component 228. A power source (e.g., a battery, e.g., a rechargeable battery) is also stored in the first housing 220, for example in a battery compartment 232. The power source may be operatively connected to the shocking component 228 and/or the first microprocessor. In some embodiments, a first indicator light 234 is disposed on the first housing 220, for example on the outside surface, for indicating the status of the battery (e.g., green for charged, yellow for low). Such indicator lights are well known to one of ordinary skill in the at. The first indicator light 234 may be operatively connected to the power source and/or the first microprocessor.

Figure 4:
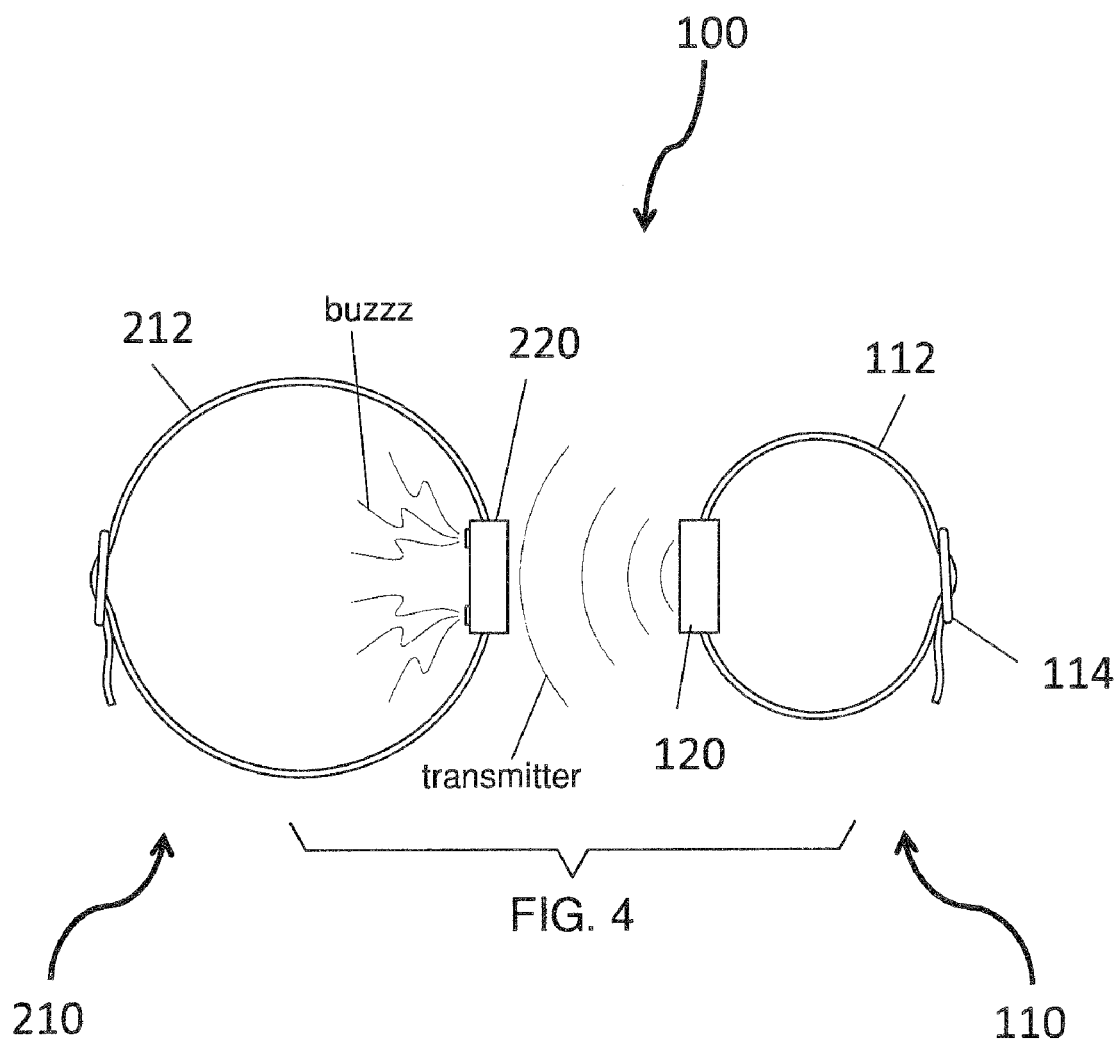
FIG. 4 is a top view of the dog collar and cat collar of the system of the present invention.
Figure 5:
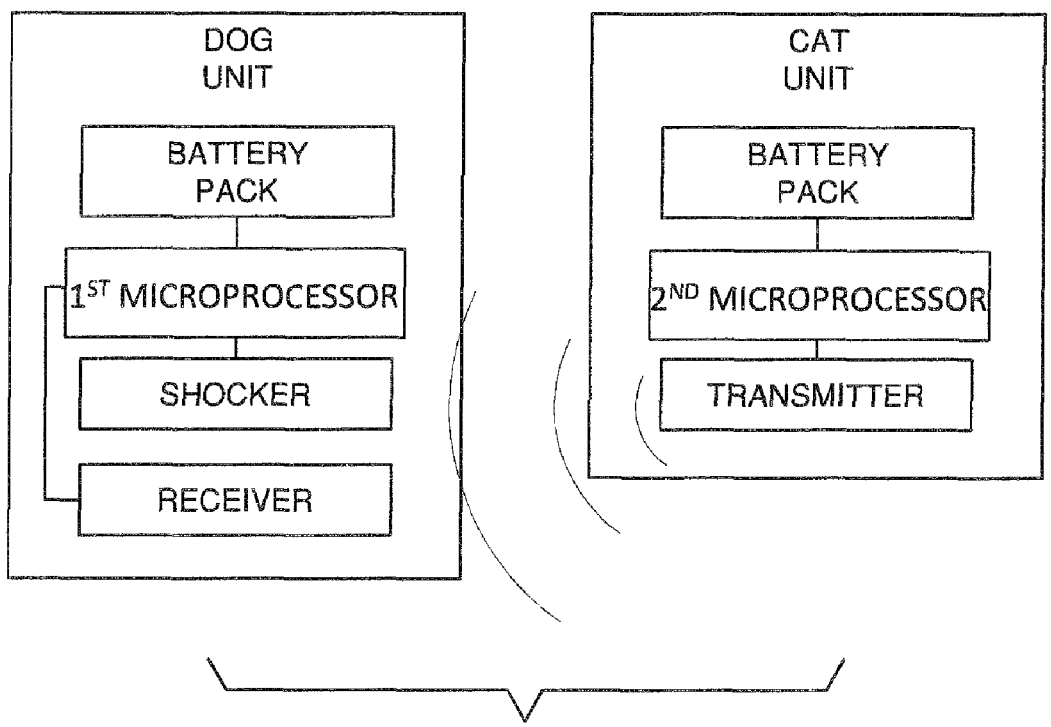
FIG. 5 is a schematic representation of the electrical components of the system of the present invention.

As shown in FIG. 4, the cat collar 110 comprises a second collar band 112 for securing around the neck of the cat via a second attachment means 114 (e.g., a buckle, a clasp, a snap, a button, etc.). Disposed on the second collar band 112 is a second housing 120 for housing various electrical components. The second housing 120 has an outer surface, an inner surface, and an inner cavity.

Disposed in the second housing 120 is a second microprocessor operatively connected to a power source (e.g., a battery, e.g., a rechargeable battery). In some embodiments, a second indicator light 134 is disposed on the second housing 120, for example on the outside surface, for indicating the status of the battery (e.g., green for charged, yellow for low). The second indicator light 134 may be operatively connected to the power source and/or the second microprocessor.

The second housing 120 of the cat collar 110 comprises a transmitter component adapted to communicate with a receiver component disposed in the first housing 220 of the dog collar 210 within a range. Transmitter-receiver systems are well known to one of ordinary skill in the art. For example, the transmitter component is adapted to send a transmitter signal to the receiver component (within the range). In some embodiments, the range is between about 0 and 2 feet. In some embodiments, the range is between about 0 and 4 feet. In some embodiments, the range is between about 0 and 6 feet. In some embodiments, the range is between about 0 and 8 feet. In some embodiments, the range is between about 0 and 10 feet. In some embodiments, the range is between about 0 and 15 feet. In some embodiments, the range is more than about 15 feet. The present invention is not limited to the aforementioned ranges. The range may be adjustable. For example, in some embodiments, a user may wish to gradually reduce the range as the dog becomes trained to behave properly around the cat.

The first microprocessor is adapted to receive a first receiver signal from the receiver component when the receiver component receives the transmitter signal. Upon receipt of the first receiver signal, the microprocessor is configured to send a first alert output command to the shocking component 228 to activate the shocking component 228 at a particular level (e.g., intensity) for a first length of time. The level (e.g., intensity) and the length of time of the activation of the shocking component 228 are adjustable, similar to adjusting these conditions in collars for electric fences. For example, the shocking component of such collars may range from 0 to 127 levels.

In some embodiments, a sound component is disposed in the first housing 220 operatively connected to the first microprocessor. The sound component may be configured to emit a sound such as a tone or series of tones or pattern of tones. In some embodiments, upon receipt of the first receiver signal, the microprocessor is configured to send a second alert output command to the sound component to activate the sound component. The sound component may be helpful, for example, to warn the dog before the shocking component 228 is activated. The sound component may also be helpful to alert a dog owner so as to supervise the situation.

The first microprocessor can be configured to activate the shocking component and/or sound component as desired by the user. For example, a user may wish to only have the sound component activated. Or, a user may wish to have the sound component activated at a certain range and the shocking component 228 activated at another range (shorter range, for example). Such adjustments and programming is often found in standard collars used with electric fences.

In some embodiments, the dog collar 210 and/or the cat collar 110 each have an on/off switch for turning the transmitter and/or receiver and/or shocking component and/or sound component off when desired. The on/off switch may be a magnetic switch, for example, however the present invention is not limited to a magnetic switch.

As used herein, the term "about" refers to plus or minus 10% of the referenced number. For example, an embodiment wherein the range is up to about 10 feet includes a range up to between 9.9 and 10.1 feet.

The disclosures of the following U.S. patents are incorporated in their entirety by reference herein: U.S. Pat. No. 5,632,232; U.S. Pat. No. 7,046,152; U.S. Pat. No. 5,575,242; U.S. Pat. No. 6,581,546; U.S. Pat. Application No. 2009/0002188.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A collar system comprising:
   (a) a dog collar comprising a first collar band for securing around a neck of a dog via a first attachment means, wherein a first housing is disposed on the first collar band, the first housing having an outer surface, an inner surface, and an inner cavity, wherein a shocking component is disposed on the inner surface of the first housing and a first microprocessor, a sound component, and a receiver component are each disposed in the first housing, the first microprocessor is operatively connected to each the shocking component, the sound component, and the receiver component, the sound component is adapted to emit a tone when activated and the shocking component is adapted to emit a shock when activated, wherein a power source is disposed in the first housing, the power source being operatively connected to the shocking component and the first microprocessor, wherein the first housing further comprises a first multi-stage indicator light disposed thereon for indicating status of a power source; and
   (b) a cat collar comprising a second collar band for securing around a neck of a cat via a second attachment means, wherein a second housing is disposed on the second collar band, the second housing having an outer surface, an inner surface, and an inner cavity, wherein a second microprocessor and a transmitter component are each disposed in the second housing, the transmitter component is adapted to send a transmitter signal to the receiver component in the first housing within a range, the second microprocessor is operatively connected to the transmitter component, wherein a power source is disposed in the second housing, the power source being operatively connected to the second microprocessor, wherein the second housing further comprises a second multi-stage indicator light disposed thereon for indicating status of a power source;

wherein the first microprocessor is adapted to receive a first receiver signal from the receiver component when the receiver component receives the transmitter signal from the transmitter component, wherein upon receipt of the first receiver signal the first microprocessor is configured to either (i) send a first alert output command to the shocking component to activate the shocking component at a particular level for a first length of time, (ii) send a second alert output command to the sound component to activate the sound component; or (iii) send both a first alert output command to the shocking component to activate the shocking component at a particular level for a first length of time and a second alert output command to the sound component to activate the sound component.

2. The collar system of claim 1, wherein the first attachment means is a buckle, a clasp, a snap, or a button.

3. The collar system of claim 1, wherein the second attachment means is a buckle, a clasp, a snap, or a button.

4. The collar system of claim 1, wherein the range is between about 0 and 4 feet.

5. The collar system of claim 1, wherein the range is between about 0 and 8 feet.

6. The collar system of claim 1, wherein the range is between about 0 and 1 feet.

7. The collar system of claim 1, wherein the range is between about 0 and 15 feet.

8. The collar system of claim 1, wherein the range is more than about 15 feet.

9. The collar system of claim 1 further comprising an on/off switch disposed on each the cat collar and the dog collar for turning the transmitter and receiver component, respectively, on or off.

* * * * *